July 13, 1937.　　　F. E. MIICK　　　2,086,730
SETTLING TANK
Filed Sept. 23, 1935　　　3 Sheets-Sheet 1
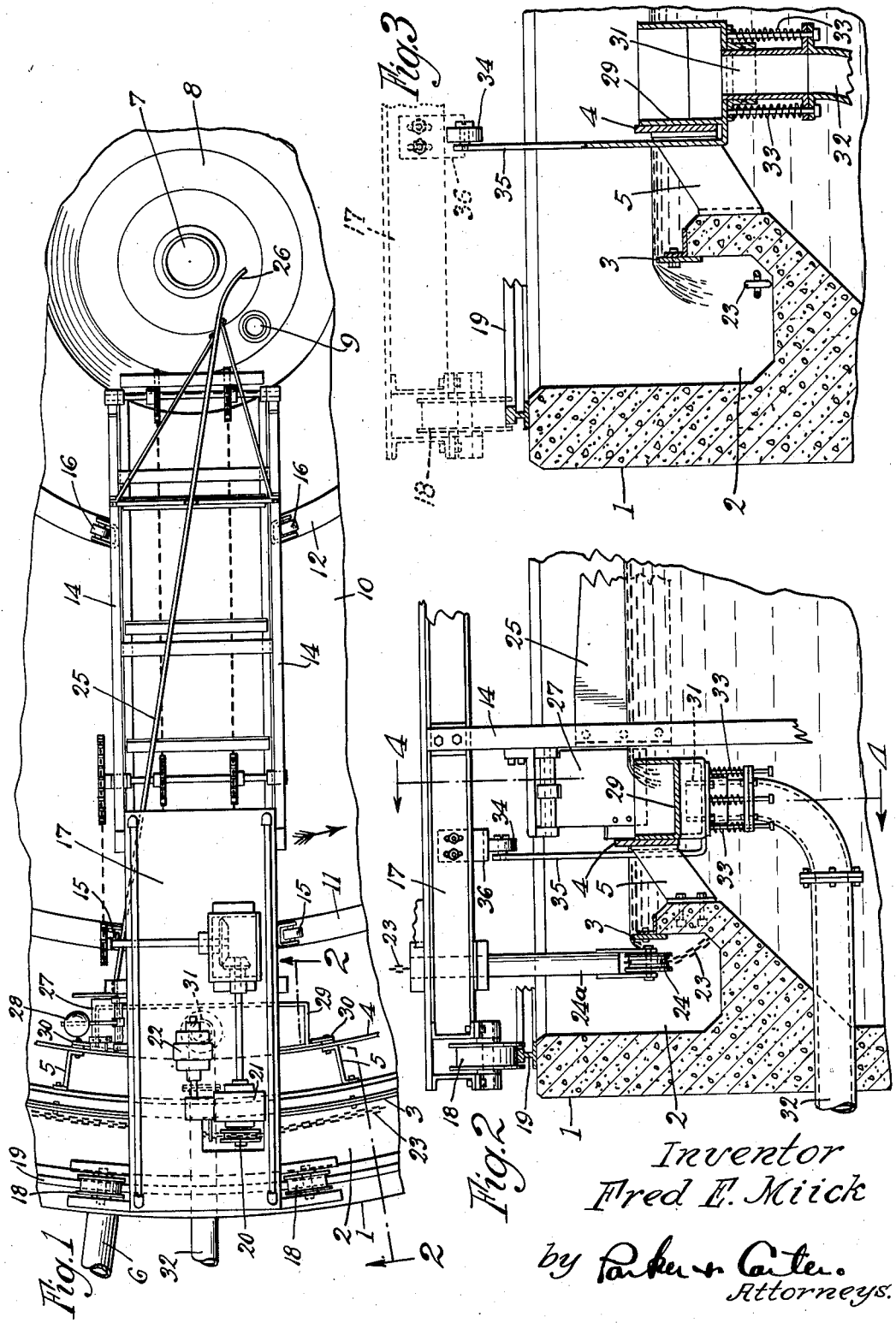
Inventor
Fred F. Miick
by Parker & Carter
Attorneys.

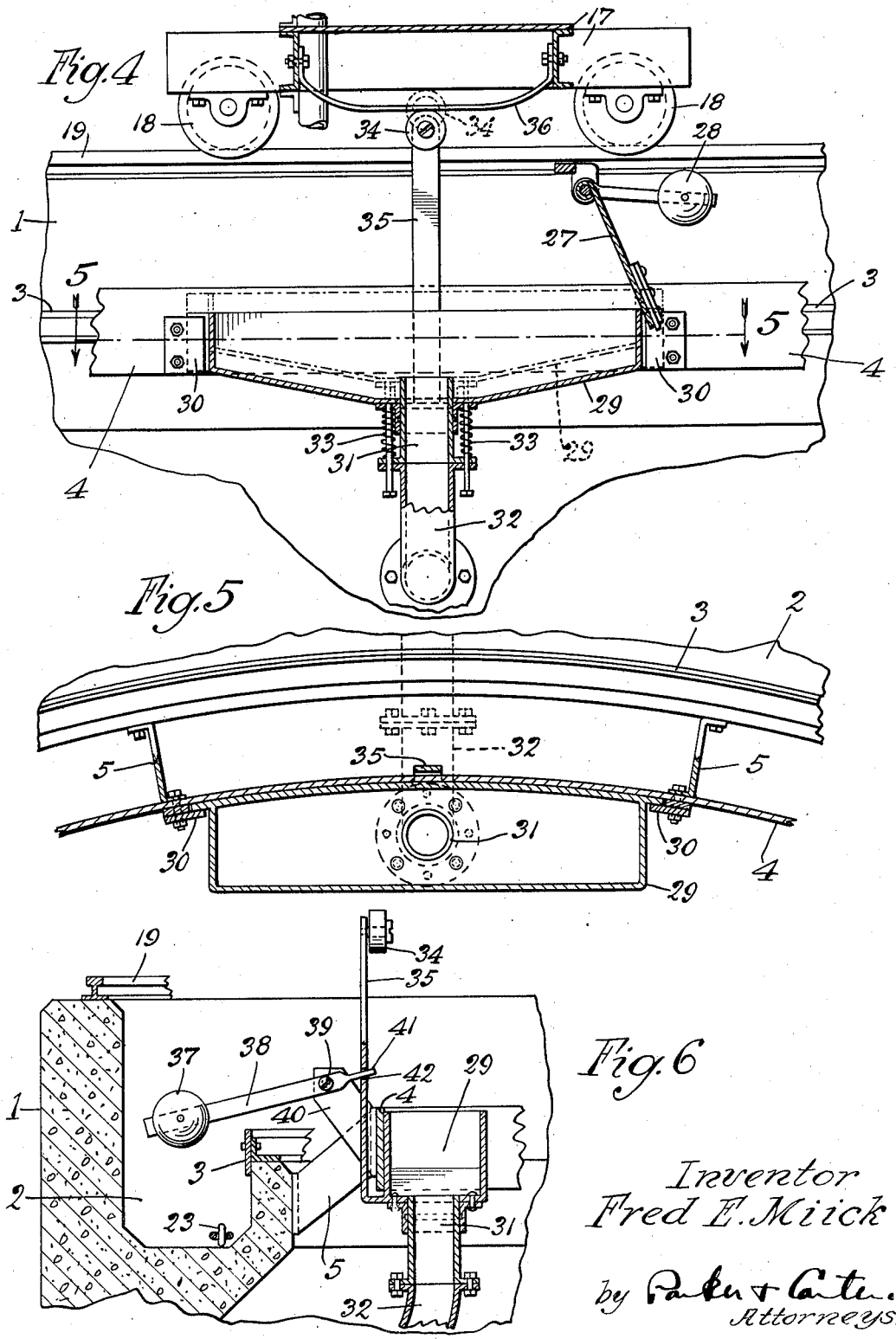

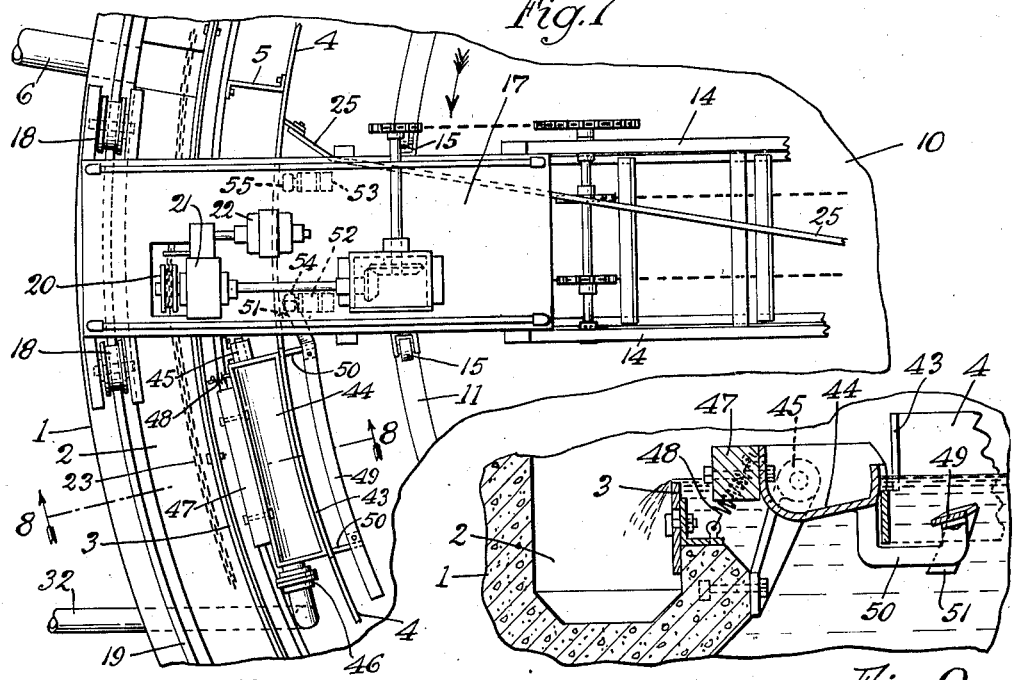
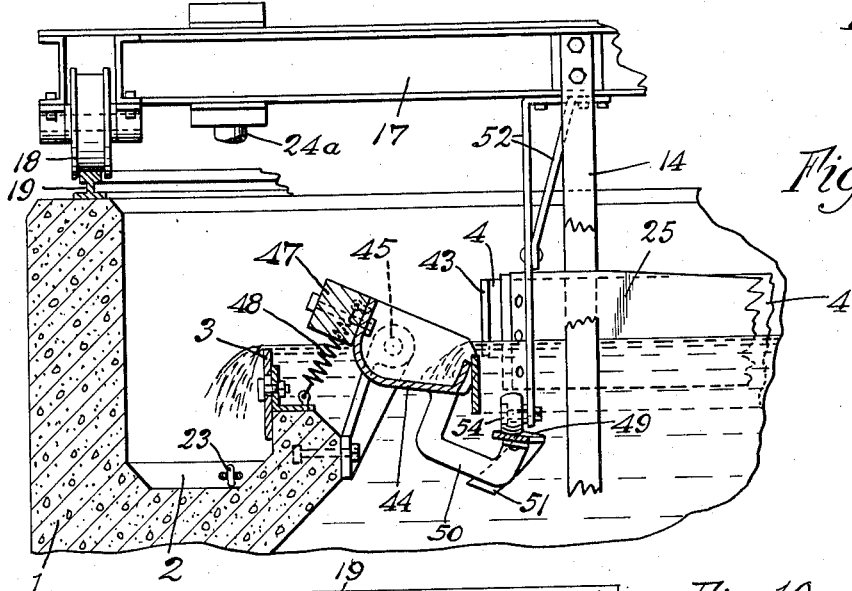
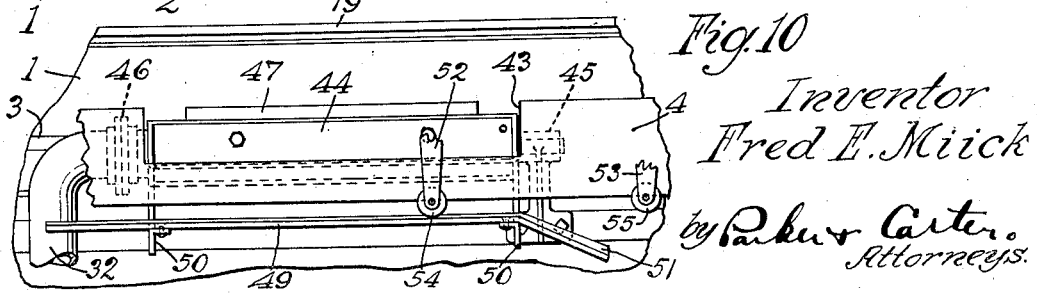

Patented July 13, 1937

2,086,730

UNITED STATES PATENT OFFICE 2,086,730

SETTLING TANK

Fred E. Miick, Los Angeles, Calif., assignor to Link-Belt Company, Chicago, Ill., a corporation of Illinois Application September 23, 1935, Serial No. 41,669

10 Claims. (Cl. 210—55)

This invention relates to material handling and separation and in the particular form illustrated herewith relates to a scum box or trough which may be combined with a skimmer in the treatment of sewage for the removal of scum from the sewage, although it is not limited to that use.

The invention has for one object to provide means for collecting and removing scum or other material floating upon or near the upper surface of a body of liquid within a tank. Another object of the invention is to provide means for removing the scum so collected, and for discharging it from the tank in which separation has been accomplished. Another object is to provide an automatically moved scum box or trough.

Other objects will appear from time to time in the specification and claims.

The invention is illustrated more or less diagrammatically in the accompanying drawings, wherein:—

Figure 1 is a partial plan view of the tank and the conveying mechanism showing a part of the scum box;

Figure 2 is a vertical sectional detail on an enlarged scale, the scum trough in depressed position and showing also the associated parts, taken at line 2—2 of Figure 1;

Figure 3 is a vertical sectional detail generally similar to Figure 2 but showing the scum trough of Figure 2 in the raised position;

Figure 4 is a generally vertical sectional detail taken at line 4—4 of Figure 2;

Figure 5 is a generally horizontal sectional detail taken at line 5—5 of Figure 4;

Figure 6 is a view similar to Figure 3 but showing a modification in the substitution of a counter-weight for springs as a means for holding the scum trough in the upper position;

Figure 7 is a plan view showing a modified form of scum trough;

Figure 8 is a transverse vertical section on an enlarged scale, at line 8—8 of Figure 7;

Figure 9 is a similar detail showing the scum trough raised;

Figure 10 is a side elevation of the modified scum trough.

Like parts are designated by like characters throughout the specification and drawings.

In the form shown herewith the apparatus comprises a tank, means for introducing liquid to it and for withdrawing liquid from it and may include means for permitting sludge to settle out of the liquid and for moving the sludge to a discharge point and for discharging it therefrom. It includes also means for sweeping scum from the surface of the liquid and for removing it therefrom. It is to be understood that the invention is not to be limited to a tank of any particular shape.

The tank is formed of a wall 1 having an overflow trough 2 formed about its upper edge. The overflow trough is bounded on its inner edge by an adjustable weir 3 which may be adjusted to maintain a uniform depth of fluid discharge about the entire periphery of the tank. A scum baffle 4 is preferably supported on supports or bracket members 5 at or near the edge of the tank and conforms in shape to the tank. It extends through a zone both above and below the surface of the liquid. 6 is a discharge conduit or connection from the overflow trough 2.

In the bottom of the tank, preferably centrally located, may be provided an influent discharge 7 which may be of any desired shape. About the influent discharge 7 is a sludge trough 8 which may be annular as here shown and from which an outlet connection 9 leads. Sludge may be removed through this outlet connection. 10 is a floor or bottom of the tank. In it are positioned tracks 11 and 12, which extend about the tank and conform in shape to it. As here shown, since the tank is circular, the tracks are concentric with it.

A material conveying assembly is arranged to move as a unit about the tank. In the present case since the tank is circular it swings about the tank supported wholly or in part upon the tracks 11 and 12. The conveying assembly as shown comprises the supporting structure formed of members 14 which may carry pairs of rollers 15, 15 and 16, 16 in its bottom. These rollers run, respectively, upon the tracks 11 and 12. At its upper end the supporting structure 14 joins a bridge structure 17 which carries rollers 18 which rest upon a track 19 positioned preferably upon the wall 1 and extending about the tank. Fastened to the bottom of the supporting structure 14 may be any form of sludge plow or sludge collecting and conveying means, so that as the conveying assembly swings about the tank the entire bottom is swept by the plow, or other sludge collecting and conveying means, which may be in contact with the bottom or may merely extend close to the bottom.

The means for collecting and conveying sludge or other material which has collected on or near the floor of the tank, is not described in detail herewith because it forms no essential part of the present invention. In fact, the scum box or trough of the present invention may be, and often is, used in installations which have no sludge collecting means in the tank and the showing and the description of the sludge collecting and discharging means is included merely to point out the fact that the device of the present invention may be associated in an installation which includes sludge collecting, conveying and discharging means.

While a variety of skimming means may be used and while the scum box or trough of the present invention may be associated with many different skimming means, for purposes of illustration it is shown herewith as associated with a skimming device which comprises a scum plow mounted upon the bridge-like conveying assembly which is driven or moved about the tank so as to sweep and skim the entire surface of the liquid within the tank. Where a sludge conveying mechanism is to be used in the same installation, it is preferably, although not essentially, carried by the same bridge-like structure and, in so far as the sludge collecting means is shown herewith, it is shown as mounted upon the bridge. While the bridge may be moved about the tank in any desired manner, it is shown here as being moved by means of a chain which lies within the overflow trough 2. The driving means will now be described.

A pocketed wheel 20 driven through a reduction gearing 21 from a motor 22 engages an endless chain 23, which lies in the overflow trough 2 and passes upwardly about or between one or more rollers or sheaves 24 carried in the lower end of a hollow arm 24a. By this means when the pocketed wheel rotates the conveying assembly pulls itself about the tank, using the chain, as a traction means.

As shown in Figure 1, the bridge and supporting structure carry a fixed scum plow 25, supported from the supporting structure 14 or the bridge 17. At its inner end the plow may be provided with a curved portion 26 and at its outer end carries a pivoted section 27 which is arranged to swing so that it may sweep over the scum trough, because ordinarily it extends downwardly somewhat below the level of the surface of the liquid. A counter-weight 28 may be provided for the hinged portion of the scum collector 27 to hold it normally in the downward position.

As shown in Figures 2 and 3, the scum trough is mounted for vertical reciprocation. In this form of the invention there is a scum trough 29 carried in guides 30 fixed to the scum baffle 4. The scum trough is perforated in its bottom to permit an outlet member 31 to connect with it. This outlet member is connected to the outlet conduit 32 as shown in detail in Figures 2 and 3.

In the form shown in Figures 2, 3 and 4, coiled springs 33 hold the scum trough in the raised position shown in Figure 3, in which its upper edge is above the surface of the liquid. As shown in Figure 2, it has been moved so that its upper edge is below the surface of the liquid. This movement is caused by the contact of a roller 34 carried by an arm 35 from the scum trough, with a cam 36, adjustably mounted on the bottom of the bridge 17.

In the form of the invention shown in Figure 6, the scum trough and a means for operating it are the same as above described but instead of the springs 33 for holding the scum trough upward, a counter-weight 37 is used. This counter-weight is adjustably mounted upon an arm 38 pivoted as at 39 upon a bracket 40 which may be carried by one of the supports 5 or may be mounted directly upon the scum baffle 4. The arm 38 is provided with an extension 41 which engages the arm 35 in any suitable manner. As here shown it extends through a perforation or opening 42 in the arm 35.

In the form of the movable scum trough shown in Figures 7 to 10, inclusive, the scum box or trough, instead of being mounted for vertical movement, is mounted to be tilted. Instead of being mounted inside the scum baffle 4 it is mounted outside of it and the baffle is cut away as at 43 opposite the scum trough to permit scum to flow into the trough when the latter is depressed or tilted to receive scum. Since the scum trough is outside of the scum baffle, the plow 25 does not sweep over it but merely sweeps past it and needs no pivoted or otherwise movable section such as the section 27 shown in the earlier figures, which is necessary to clear the scum box since the latter lies inside of the scum baffle 4. Otherwise the general arrangement of the mechanism, such as the bridge assembly, means for driving it, the tank itself, the scum baffle, the effluent discharge and the scum discharge conduit, are the same as those above described.

In the form illustrated in Figures 7 to 10, inclusive, a scum box or trough 44 is mounted adjacent the edge of the tank, outside of the scum baffle 4 and in register with the cut away portion 43 of the baffle. At one end it is pivoted upon a bearing 45 and at the opposite end it is pivoted on an outlet connection 46 which joins the discharge conduit 32 through which scum is carried from the trough.

The scum trough may be provided with a counterweight 47 and a spring 48, or both of them, to assist in holding it in the upright position, in which position its inner edge is above the level of liquid within the tank.

As shown in Figures 8 and 10, the scum trough is in the tilted or scum-receiving position, while as shown in Figures 7 and 9 it is in the upright or non-receiving position, in which its upper edge is above the level of liquid within the tank, so that neither scum nor liquid can flow into it.

As a means for tilting or depressing the scum box or trough 44, a cam 49 is attached to the box by brackets 50. At one end the cam may be downwardly bent and outwardly curved as at 51. One or more arms 52, 53 depend downwardly from the bridge structure 17 and, respectively, carry at their lower ends rollers 54, 55, which may contact the cam 49. It is normally preferable to have two rollers so that the cam is contacted and the scum box held in the tilted position long enough during the movement of the bridge structure and the skimmer to permit complete discharge of the collected scum into the scum box.

It will be realized that whereas I have herewith shown and described a practical operative device, nevertheless many changes might be made in the size, shape, number and disposition of parts without departing from the spirit of the invention and I wish, therefore, that my showing be taken as in a sense diagrammatic.

In particular, the present invention is concerned primarily with the scum box and not with any special means for collecting scum or floating solids and delivering them to the baffle and to the scum box or hopper. In other words, while one satisfactory collector is shown, almost an infinite variety of collectors might be used in connection with one or another of the scum boxes shown, and any scum collector which satisfactorily collects the scum or floating solids and delivers them to the baffle or the scum box is satisfactory. The present invention is in no way limited to the particular type of scum collector shown nor to any other type of scum collector.

The use and operation of the invention are as follows:

In the form of the invention illustrated, the liquid to be handled, with whatever solids it may carry, is introduced into the tank through the member 7. The level of liquid is controlled by the adjustable weir 3, which also insures uniform depth of discharge of liquid over the weir. Ordinarily some solids within the body of liquid will settle toward the bottom and some scum which may be composed of light solids or a mixture of solids and gases which cause it to float, or other materials, accumulates at or near the upper surface of the liquid. In order to collect the material at the bottom of liquid for withdrawal from the tank, the conveying assembly comprising the frame 14 the bridge 17 and the driving and conveying parts which they carry, is driven around the tank by the engagement of the chain with the pocketed wheel. The movement of the assembly about the tank is ordinarily very slow.

As the assembly moves about the tank the sludge conveyor, if one is used, moves material toward the sludge trough 8. Thus the entire bottom of the tank may be swept by any suitable means and the material thus swept up and any other material which the conveyor engages is moved toward and discharged into the sludge hopper from which it is removed through the connection 9.

In the form of the invention shown, the conveyor assembly just described carries a skimmer 25 which extends above and below the surfaces of the liquid in the tank, and thus it moves the scum which it encounters toward the scum baffle 4, and carries it about the tank to the scum box. By this means the scum is removed from the surface of the tank and caused to collect at or near the scum baffle, for discharge into the scum box.

As the entire assembly moves about the tank this collected scum is carried along and there is thus a collection of scum which is moved about the tank until the assembly approaches the scum box or trough 29. As that occurs the roller 39 on the scum box strikes the cam 36 carried by the bridge 17 and depresses the scum trough downwardly as shown in Figure 2, moving its upper edge below the surface of the liquid so that scum may flow into it. The scum box is returned to the raised position by the springs 33 or the weight 37.

In the form of the invention shown in Figures 7 to 10, inclusive, as the conveying and skimming assembly is moved about the tank, the roller 54 first contacts the cam 49, contacting first the portion 51 of the cam and depressing the cam and scum trough. This is the position shown in Figures 8 and 10. Thereafter, as the assembly continues to move in the direction of the arrow shown in Figure 7, the roller 54 moves along the cam. Before this roller drops off the end of the cam, the second roller 55 engages the cam and so holds the scum trough in the depressed position. During the time that the scum trough is held in the depressed position, the collected scum flows into the scum trough and is discharged through the conduit 32. When the roller 55 has passed off the cam 59 the scum trough is raised by the spring 48 or the counterweight 47 to the upright position shown in Figures 7 and 9. In that position its upper edge lies above the surface of the liquid within the tank and further discharge into it does not occur until it is again depressed.

Whatever the form of the scum box or trough, in general the result is to provide means, namely, the scum baffle 4, for preventing scum from flowing into the overflow trough 2, and to provide additional means, first for removing the scum from the surface of the liquid and for collecting it at the edge of the tank, which means may comprise the plow 25. The scum is thus removed from the entire surface of the liquid; is collected at the edge and is finally discharged into a movable scum trough, which is normally held above the surface of the liquid so that scum will not normally flow into it and which is depressed in the appropriate time in the cycle of operations to permit the accumulated scum to flow, to be discharged or otherwise forced into it and thus as the assembly moves about the tank, scum is collected and is discharged.

The operation of the various forms of scum box shown is in no way dependent upon or limited to the particular form of scum collector shown as these scum boxes might be utilized with many other types of scum collectors.

I claim:

1. In combination, a sewage treatment tank, a scum trough located partially above the surface of the liquid therein having a scum receiving edge, a skimming member, means for moving it across the surface of the liquid to move scum toward the trough, means mounted to move with the skimming member for depressing a scum receiving edge of the trough below the level of the liquid as the skimming member comes into immediate juxtaposition with the trough and means for returning the trough to its initial position as the skimming member departs therefrom.

2. In combination, a sewage treatment tank, a scum trough located partially above the surface of the liquid therein having a scum receiving edge, a skimming member, means for moving it across the surface of the liquid to move scum toward the trough, means mounted to move with the skimming member for depressing a scum receiving edge of the trough below the level of the liquid as the skimming member comes into immediate juxtaposition with the trough and means for returning the trough to its initial position as the skimming member departs therefrom, said second mentioned means including cam members associated with the skimming member, and the trough respectively and adapted to be brought into working relationship to depress the edge of the trough when the skimmer and trough are in juxtaposition one with another.

3. In combination, a sewage treatment tank, a scum trough located partially above the surface of the liquid therein having a scum receiving edge, a skimming member, means for moving it across the surface of the liquid to move scum toward the trough, means mounted to move with the skimming member for depressing a scum receiving edge of the trough below the level of the liquid as the skimming member comes into immediate juxtaposition with the trough and means for returning the trough to its initial position as the skimming member departs therefrom, said second mentioned means including cam members associated with the skimming member, and the trough respectively and adapted to be brought into working relationship to depress the edge of the trough when the skimmer and trough are in juxtaposition one with another, yielding means adapted to resist the depression of the trough in response to the action of said cam members.

4. In combination, a sewage treatment tank, a scum trough mounted for generally vertical movement therein, yielding means for holding the trough partially above the surface of the liquid in the tank, a skimming member, means for moving it across the surface of the liquid to move scum toward the trough, means mounted to move with the skimming member for depressing the trough against the yielding means below the level of the liquid as the skimming member comes into immediate juxtaposition with the trough.

5. In combination, a sewage treatment tank, a scum trough mounted for generally vertical movement therein, yielding means for holding the trough partially above the surface of the liquid in the tank, a skimming member, means for moving it across the surface of the liquid to move scum toward the trough, means mounted to move with the skimming member for depressing the trough against the yielding means below the level of the liquid as the skimming member comes into immediate juxtaposition with the trough, such means comprising cam members associated with the trough and with the skimming member respectively and adapted to be brought into juxtaposition one with another when the the skimming member is in close proximity with the trough.

6. In combination, a sewage treatment tank, a scum trough mounted for generally vertical movement therein, yielding means for holding the trough partially above the surface of the liquid in the tank, a skimming member, means for moving it across the surface of the liquid to move scum toward the trough, means mounted to move with the skimming member for depressing the trough against the yielding means below the level of the liquid as the skimming member comes into immediate juxtaposition with the trough, a discharge pipe for the trough, there being a movable connection between the pipe and the trough whereby the trough is free to move vertically while maintaining such connection intact.

7. In combination, a sewage treatment tank, a pivotally mounted scum trough associated with the tank, yielding means for resisting rotation of the scum trough and adapted to hold it in position with all its edges above the surface of the liquid in the tank, a skimming member, means for moving it across the surface of the liquid to move scum toward the trough, means mounted to move with the skimming member adapted to rotate the trough to bring one edge below the surface of the liquid as the skimmer comes into immediate juxtaposition with the trough.

8. In combination, a sewage treatment tank, a pivotally mounted scum trough associated with the tank, yielding means for resisting rotation of the scum trough and adapted to hold it in position with all its edges above the surface of the liquid in the tank, a skimming member, means for moving it across the surface of the liquid to move scum toward the trough, means mounted to move with the skimming member adapted to rotate the trough to bring one edge below the surface of the liquid as the skimmer comes into immediate juxtaposition with the trough, said means comprising a lever arm associated with the trough, a cam member mounted on the lever arm, a cam member associated with the skimming member, their relative positions being such that when they are brought into engagement as the skimming member travels past the trough, the trough is tilted.

9. In combination, a sewage treatment tank, an effluent discharge weir, a baffle extending above and below the surface of the liquid in front of the effluent discharge weir, a scum trough located adjacent the baffle partially above the surface of the liquid in the tank and having a scum receiving edge, a skimming member, means for moving it across the surface of the liquid to move scum toward the baffle and along the baffle toward the trough and means mounted to move with the skimming member for depressing said scum receiving edge of the trough below the level of the liquid as the skimming member comes into immediate juxtaposition with the trough and means for returning the trough to its initial position as the skimming member departs therefrom.

10. In combination, a generally circular sewage treatment tank, an effluent weir arranged about the periphery thereof, a scum baffle extending above and below the surface of the liquid, a scum trough located partially above the surface of the liquid in the tank and adjacent the baffle and having a scum receiving edge, a bridge having one end adapted to travel along the generally circular wall of the tank, a skimming member carried by the bridge having one end adjacent the baffle, means associated with the bridge for moving such end of the skimming member along the baffle to move scum toward the baffle and along the baffle toward the trough, cam means carried by the bridge and by the trough for depressing said scum receiving edge of the trough below the level of the liquid as the skimming member comes into immediate juxtaposition with the trough and means for returning the trough to its initial position as the skimming member departs therefrom.

FRED E. MIICK.